United States Patent
Tsai et al.

(10) Patent No.: US 12,493,344 B1
(45) Date of Patent: Dec. 9, 2025

(54) TWO-SECTION HEAD MOUNTED SYSTEM

(71) Applicant: ASUSTek COMPUTER INC., Taipei (TW)

(72) Inventors: Yun-Wei Tsai, Taipei (TW); Chi-Liang Tsai, Taipei (TW); Chien-Ming Lin, Taipei (TW); Lin-Wei Chiu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/940,846

(22) Filed: Nov. 8, 2024

(30) Foreign Application Priority Data

Sep. 3, 2024 (TW) .................................. 113133243

(51) Int. Cl.
  *G06F 3/01* (2006.01)
(52) U.S. Cl.
  CPC .................................. *G06F 3/011* (2013.01)
(58) Field of Classification Search
  None
  See application file for complete search history.

(56) References Cited

U.S. PATENT DOCUMENTS

| | | |
|---|---|---|
| 2020/0091214 A1 | 3/2020 | Ikeda |
| 2022/0221747 A1 | 7/2022 | Schowengerdt et al. |
| 2024/0295741 A1 | 9/2024 | Su et al. |

FOREIGN PATENT DOCUMENTS

| | | |
|---|---|---|
| CN | 207475731 | 6/2018 |
| CN | 214201926 | 9/2021 |
| TW | M643746 | 7/2023 |
| WO | 2022219801 | 10/2022 |

*Primary Examiner* — Aneeta Yodichkas
(74) *Attorney, Agent, or Firm* — JCIPRNET

(57) ABSTRACT

A two-section head mounted system is provided. The two-section head mounted system has an arithmetic processing part, a head mounted part, and a cable part. The arithmetic processing part and the head mounted part are connected to each other through a plurality of optical fiber cables in the cable part. The two-section head mounted system includes a processor, a first conversion device, an image device, and a second conversion device. The processor is installed in the arithmetic processing part. The first conversion device is configured to perform parallel-to-serial conversion and photoelectric conversion on signals transmitted between the processor and the optical fiber cables. The image device is installed in the head mounted part. The second conversion device is configured to perform parallel-to-serial conversion and photoelectric conversion on signals transmitted between the image device and the optical fiber cables.

10 Claims, 6 Drawing Sheets

TWO-SECTION HEAD MOUNTED SYSTEM

CROSS-REFERENCE TO RELATED APPLICATION

This application claims the priority benefit of Taiwan application serial no. 113133243, filed on Sep. 3, 2024. The entirety of the above-mentioned patent application is hereby incorporated by reference herein and made a part of this specification.

BACKGROUND

Technical Field

The disclosure relates to a two-section head mounted system that takes both comfort and stability into consideration.

Description of Related Art

As technology advances with each passing day, the ways in which people absorb information are also increasing. In order to take into account the requirements of visual effects and portability, many head mounted virtual reality (VR) device products have been launched on the market. However, the biggest problem for consumers is that the device is too heavy and cannot be worn for a long time, thus affecting the comfort of use.

Moving the battery and mainboard outside the head mounted part is a feasible way to reduce the weight on the user's head. However, the elements inside the head mounted part must be connected to a processor on the mainboard for signal transmission. Not only may the signal strength attenuate as the transmission length increases, but it may also cause display delays if the transmission speed is not fast enough. Therefore, how to stably transmit signals from the head mounted part to the processor on the mainboard is one of the focuses of research and development by various manufacturers.

SUMMARY

The disclosure provides a two-section head mounted system, which has an arithmetic processing part, a head mounted part, and a cable part. The arithmetic processing part and the head mounted part are connected to each other through a plurality of optical fiber cables in the cable part. The two-section head mounted system includes a processor, a first conversion device, an image device, and a second conversion device. The processor is installed in the arithmetic processing part. The first conversion device is coupled to the processor and configured to perform parallel-to-serial conversion and photoelectric conversion on signals transmitted between the processor and the optical fiber cables. The image device is installed in the head mounted part. The second conversion device is coupled to the image device and configured to perform parallel-to-serial conversion and photoelectric conversion on signals transmitted between the image device and the optical fiber cables.

Based on the above, the two-section head mounted system of the disclosure may use optical fiber as the signal transmission medium, taking advantage of its long-distance transmission stability and wide bandwidth to avoid signal strength from attenuating as the transmission length increases. In this way, while making the head mounted part lightweight, the system may also operate stably, meeting the requirements of comfort and stability.

In order to make the above-mentioned features and advantages of the disclosure clearer and easier to understand, the following embodiments are given and described in details with accompanying drawings as follows.

DESCRIPTION OF THE EMBODIMENTS

Figure 1A:
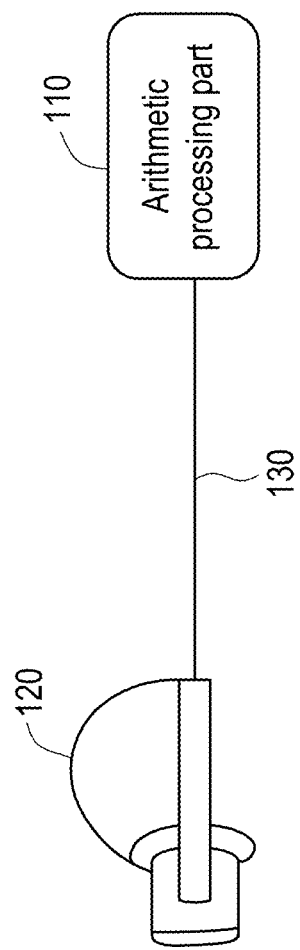
FIG. 1A is a product schematic diagram of a two-section head mounted system according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

Figure 1B:
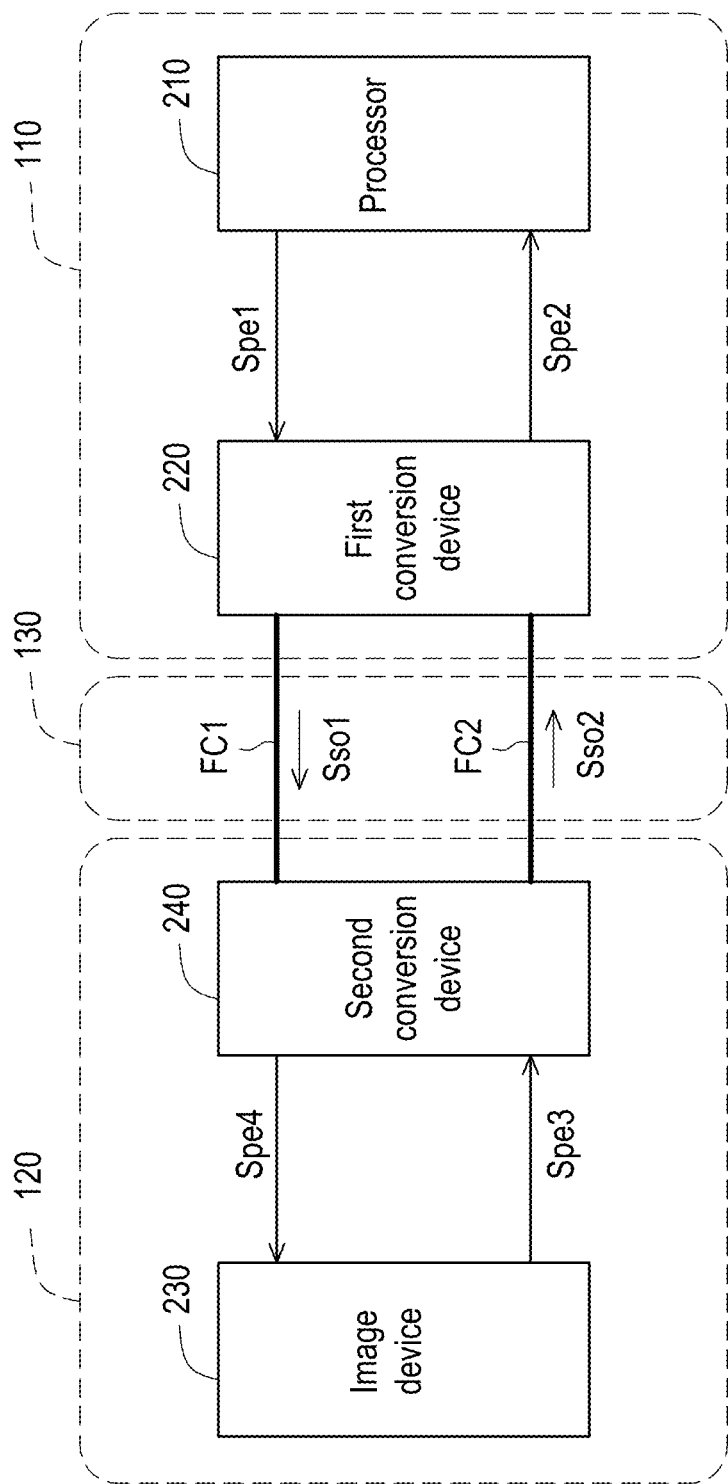
FIG. 1B is a block schematic diagram of a two-section head mounted system according to an embodiment of the disclosure.
Figure 2:
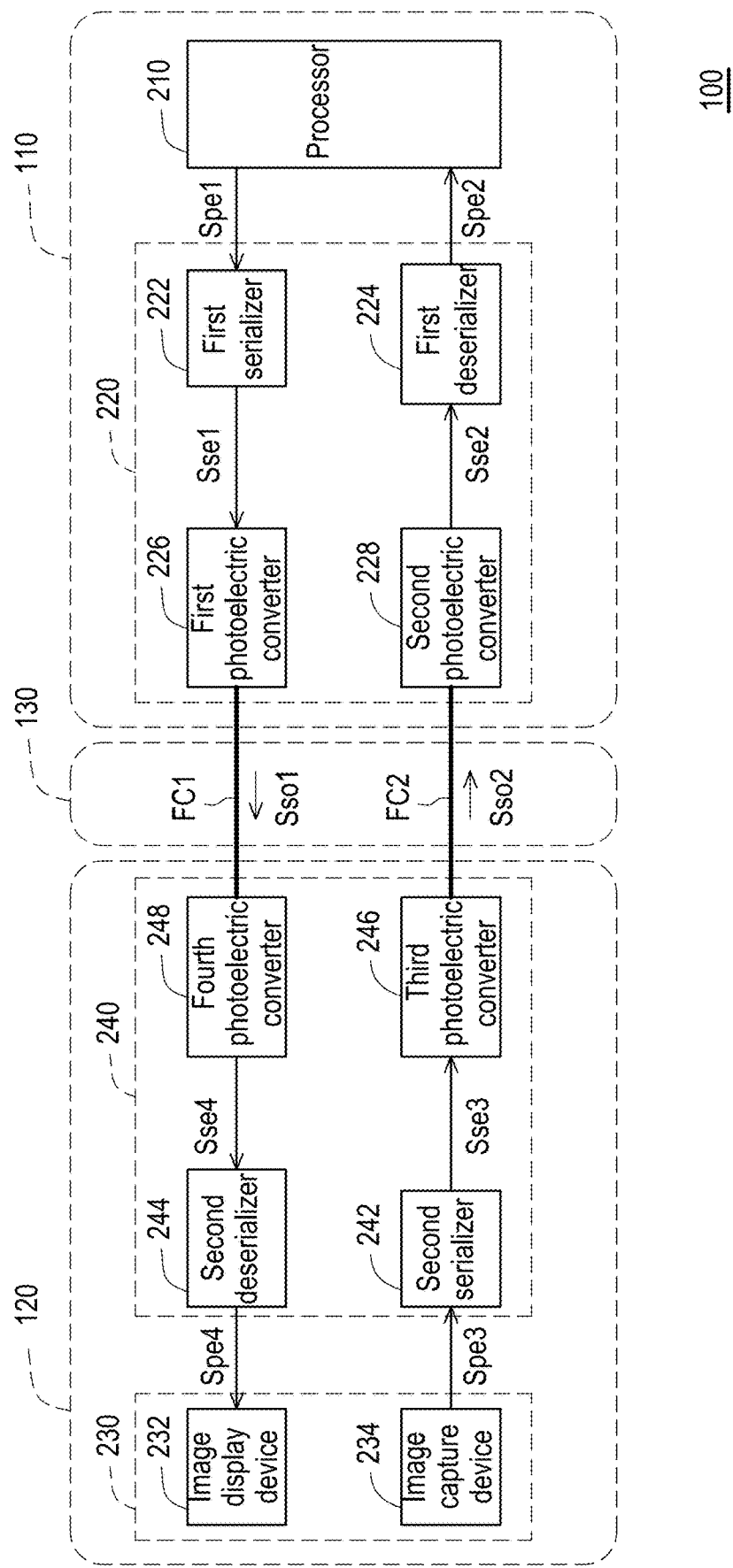
FIG. 2 is a schematic diagram of an internal circuit of the two-section head mounted system shown in the embodiment of FIG. 1B.

Referring to FIG. 1A, FIG. 1B, and FIG. 2 at the same time, a two-section head mounted system 100 of the embodiment may be divided into an arithmetic processing part 110, a head mounted part 120, and a cable part 130. The arithmetic processing part 110 mainly serves as the signal and data processing center of the two-section head mounted system 100. The internal circuit board (mainboard) thereof has a large area and scale, and the lines are also relatively complex. The arithmetic processing part 110 may also include heavy components such as batteries and memories (such as hard disks), and is suitable for being worn on other parts of the body other than the user's head, such as being carried on the user's back or strapped to the user's body. The head mounted part 120 is mainly responsible for displaying and capturing images in front of the user's eyes, and may include various sensors to sense objects in front of the user. The internal circuit board (small board) of the head mounted part 120 is small in area and scale, and has relatively simple lines, and is suitable for being worn on the user's head.

The cable part 130 is, for example, composed of a plurality of optical fiber cables. As shown in FIG. 1B, the arithmetic processing part 110 and the head mounted part 120 may be connected to each other through a first optical fiber cable FC1 and a second optical fiber cable FC2 in the cable part 130, thereby transmitting signals to each other.

The two-section head mounted system 100 of the embodiment includes a processor 210, a first conversion device 220, an image device 230, and a second conversion device 240. The processor 210 is, for example, a central processing unit (CPU), or other programmable general-purpose or special-purpose microprocessors, a digital signal processor (DSP), a programmable controller, an application specific integrated circuit (ASIC), or other similar elements, or a combination thereof. The processor 210 is installed in the arithmetic processing part 110.

The first conversion device 220 is coupled to the processor 210. The first conversion device 220 may be used to perform parallel-to-serial conversion and photoelectric conversion on signals transmitted between the processor 210 and the plurality of optical fiber cables (the first optical fiber cable FC1 and the second optical fiber cable FC2). Specifically, in FIG. 2, the first conversion device 220 includes a first serializer 222, a first deserializer 224, a first photoelectric converter 226, and a second photoelectric converter 228. The first serializer 222 and the first deserializer 224 are coupled to the processor 210, and the first photoelectric converter 226 and the second photoelectric converter 228 are respectively coupled to the first serializer 222 and the first deserializer 224. The first photoelectric converter 226 may be used to convert an electrical signal into an optical signal, and may be implemented by, for example, an integrated light-emitting diode (LED), a laser driver, a photodiode, or other similar elements, or a combination thereof. The second photoelectric converter 228 may be used to convert an optical signal into an electrical signal, and may be implemented by, for example, an optical receiver and photodetector (APD or PD) with a transimpedance amplifier (TIA), a limiting amplifier, or other similar elements, or a combination thereof. As shown in FIG. 2, in the embodiment, the first serializer 222, the first deserializer 224, the first photoelectric converter 226, and the second photoelectric converter 228 are installed in the arithmetic processing part 110, but the disclosure is not limited thereto.

In terms of operational details, for example, in the case where a first parallel electrical signal Spe1 is sent by the processor 210, the first conversion device 220 may first convert the high-speed first parallel electrical signal Spe1 into an ultra-high-speed first serial electrical signal Sse1 through the first serializer 222, and may then convert the ultra-high-speed first serial electrical signal Sse1 into an ultra-high-speed first serial optical signal Sso1 through the first photoelectric converter 226, so as to transmit the first serial optical signal Sso1 through the first optical fiber cable FC1.

In the case where a second serial optical signal Sso2 is received from the second optical fiber cable FC2, the first conversion device 220 may first convert the ultra-high-speed second serial optical signal Sso2 into an ultra-high-speed second serial electrical signal Sse2 through the second photoelectric converter 228, and may then convert the ultra-high-speed second serial electrical signal Sse2 into a high-speed second parallel electrical signal Spe2 through the first deserializer 224, so as to provide the second parallel electrical signal Spe2 to the processor 210. Accordingly, ultra-high-speed signal transmission and reception may be completed.

The image device 230 is installed in the head mounted part 120 and includes an image display device 232 and an image capture device 234. The image display device 232 is, for example, a display using a micro organic light-emitting diode (Micro OLED), an organic light-emitting diode (OLED), a liquid crystal display (LCD), a light-emitting diode (LED), a field emission display (FED), or other types of displays. The image display device 232 may display an image according to a signal (a fourth parallel electrical signal Spe4) received by the image device 230.

The image capture device 234 is, for example, a device including an optical fixed focus lens or an optical zoom lens, and a photosensitive element such as a charge coupled device (CCD) or a complementary metal-oxide semiconductor (CMOS) device. The image capture device 234 may convert the captured image into a signal (a third parallel electrical signal Spe3) and output the third parallel electrical signal Spe3 to the second conversion device 240.

The second conversion device 240 is coupled to the image device 230. The second conversion device 240 may be used to perform parallel-to-serial conversion and photoelectric conversion on signals transmitted between the image device 230 and the plurality of optical fiber cables (the first optical fiber cable FC1 and the second optical fiber cable FC2). Specifically, in FIG. 2, the second conversion device 240 includes a second serializer 242, a second deserializer 244, a third photoelectric converter 246, and a fourth photoelectric converter 248. The second serializer 242 and the second deserializer 244 are respectively coupled to the image capture device 234 and the image display device 232 in the image device 230. The third photoelectric converter 246 and the fourth photoelectric converter 248 are respectively coupled to the second serializer 242 and the second deserializer 244. The third photoelectric converter 246 may be used to convert an electrical signal into an optical signal, and may be implemented by, for example, an integrated light emitting diode, a laser driver, a photodiode or other similar elements, or a combination thereof. The fourth photoelectric converter 248 may be used to convert an optical signal into an electrical signal, and may be implemented by, for example, an optical receiver and photodetector with a transimpedance amplifier, a limiting amplifier, or other similar elements, or a combination thereof. As shown in FIG. 2, in the embodiment, the second serializer 242, the second deserializer 244, the third photoelectric converter 246, and the fourth photoelectric converter 248 are installed in the head mounted part 120, but the disclosure is not limited thereto.

In terms of operational details, for example, in the case where the third parallel electrical signal Spe3 is sent by the image capture device 234 in the image device 230, the second conversion device 240 may first convert the high-speed third parallel electrical signal Spe3 into an ultra-high-speed third serial electrical signal Sse3 through the second serializer 242, and may then convert the ultra-high-speed third serial electrical signal Sse3 into the ultra-high-speed second serial optical signal Sso2 through the third photoelectric converter 246, so as to transmit the second serial optical signal Sso2 through the second optical fiber cable FC2.

In the case where the first serial optical signal Sso1 is received from the first optical fiber cable FC1, the second conversion device 240 may first convert the ultra-high-speed first serial optical signal Sso1 into an ultra-high-speed fourth serial electrical signal Sse4 through the fourth photoelectric converter 248, and may then convert the ultra-high-speed fourth serial electrical signal Sse4 into the high-speed fourth parallel electrical signal Spe4 through the second deserializer 244, so as to provide the fourth parallel electrical signal Spe4 to the image display device 232 in the image device 230. Accordingly, ultra-high-speed signal transmission and reception may be completed.

Through the above-mentioned structure and operation method of the two-section head mounted system 100, the serializer may be used to convert ultra-high-speed parallel signals into ultra-high-speed serial signals, thereby reducing the number of pins (pin count) required for the cable part 130. Also, compared with the traditional method of transmission using electrical signals, using optical fiber as the transmission medium and using optical signals for long-distance signal transmission may give full play to the specific advantages of optical fiber, such as stable long-distance transmission, high bandwidth, low loss, low dispersion, light weight, and no EMI interference, while reducing the overall cable diameter.

It should be noted that the battery included in the arithmetic processing part 110 may, for example, provide power to the head mounted part 120 through another separate power line. In addition, there may be other components or sensors (such as distance sensors) in the arithmetic processing part 110 and the head mounted part 120 that need to transmit signals through the optical fiber cables. For the signal transmission method thereof, reference may be made to the above-mentioned FIG. 1B and the embodiment shown in FIG. 2, and therefore it is not repeated herein.

Figure 3:
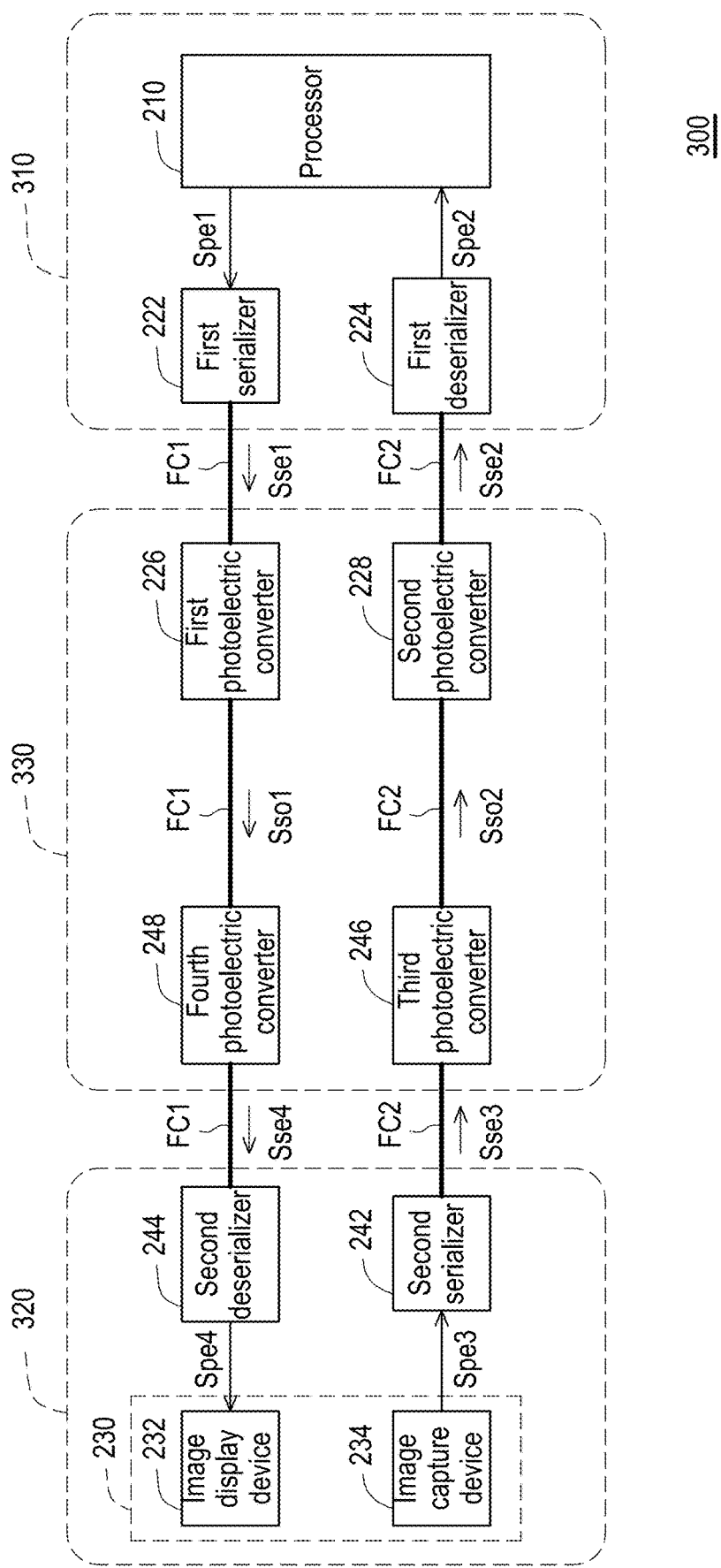
FIG. 3 is a schematic diagram of an internal circuit of a two-section head mounted system according to an embodiment of the disclosure.

FIG. 3 illustrates another embodiment of a two-section head mounted system. A two-section head mounted system 300 of the embodiment may be divided into an arithmetic processing part 310, a head mounted part 320, and a cable part 330. Each component included in the two-section head mounted system 300 is the same or similar to each component included in the two-section head mounted system 100 of the previous embodiment, so its detailed implementation details and operation methods are not repeated herein.

Different from the previous embodiment, in the two-section head mounted system 300 in the embodiment, the first serializer 222 and the first deserializer 224 are installed in the arithmetic processing part 310. The first photoelectric converter 226 and the fourth photoelectric converter 248 are installed on the first optical fiber cable FC1 in the cable part 330. The second photoelectric converter 228 and the third photoelectric converter 246 are installed on the second optical fiber cable FC2 in the cable part 330. The second serializer 242 and the second deserializer 244 are installed in the head mounted part 320. Based on this, those skilled in the art may arbitrarily adjust the positions of each component in the two-section head mounted system according to their actual requirements.

Figure 4:
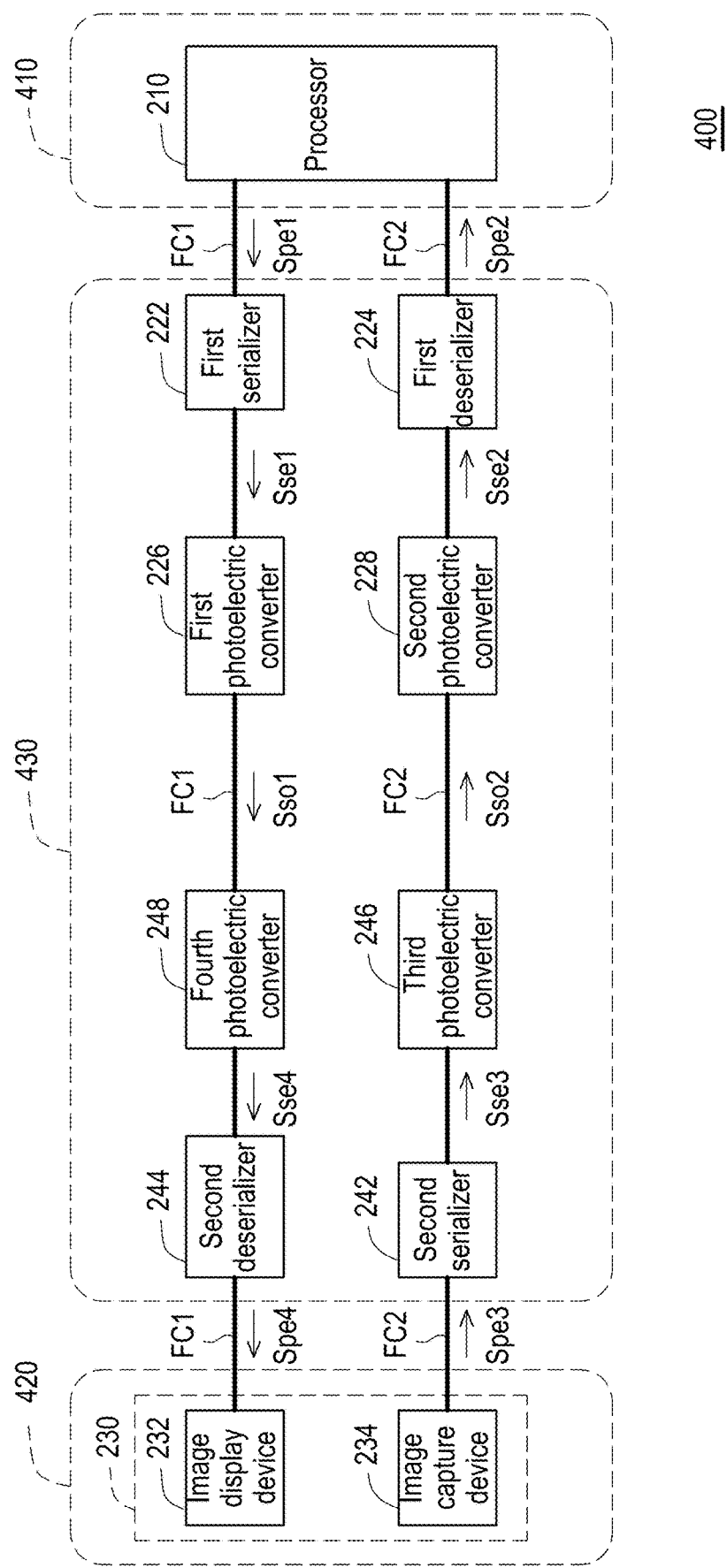
FIG. 4 is a schematic diagram of an internal circuit of a two-section head mounted system according to an embodiment of the disclosure.

FIG. 4 illustrates yet another embodiment of a two-section head mounted system. A two-section head mounted system 400 of the embodiment may be divided into an arithmetic processing part 410, a head mounted part 420, and a cable part 430. Each component included in the two-section head mounted system 400 is the same or similar to each component included in the two-section head mounted system 100 of the previous embodiment, so its detailed implementation details and operation methods are not repeated herein.

Different from the previous embodiment, in the two-section head mounted system 400 in the embodiment, the first serializer 222, the first photoelectric converter 226, the fourth photoelectric converter 248, and the second deserializer 244 are installed on the first optical fiber cable FC1 in the cable part 430. The first deserializer 224, the second photoelectric converter 228, the third photoelectric converter 246, and the second serializer 242 are installed on the second optical fiber cable FC2 in the cable part 430. Based on this, those skilled in the art may arbitrarily adjust the positions of each component in the two-section head mounted system according to their actual requirements.

Generally speaking, assuming that the display screens for the left and right eyes require high-resolution-high-frame-rate signals, since the two-section head mounted system transmits signals over a long distance through the optical fiber cables, it may encounter the problem of insufficient bandwidth. Therefore, in an embodiment, a display scaler IC may be disposed to improve signal resolution.

Figure 5:
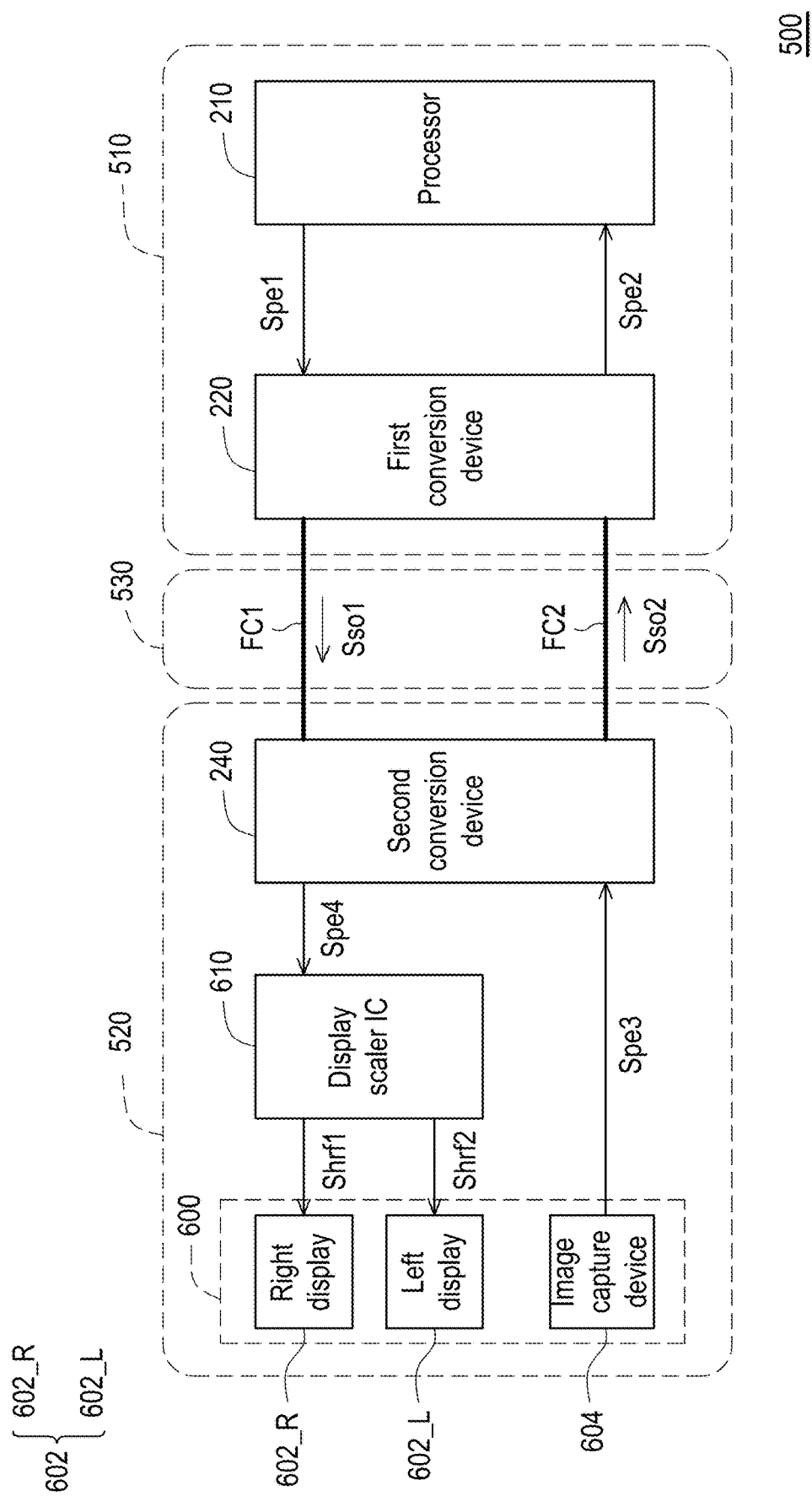
FIG. 5 is a block schematic diagram of a two-section head mounted system according to an embodiment of the disclosure.

Specifically, referring to FIG. 5, a two-section head mounted system 500 of the embodiment may be divided into an arithmetic processing part 510, a head mounted part 520, and a cable part 530. As shown in FIG. 5, the processor 210 and the first conversion device 220 are installed in the arithmetic processing part 510, and an image device 600 and the second conversion device 240 are installed in the head mounted part 520. The image device 600 includes an image display device 602 and an image capture device 604. In the embodiment, the image display device 602 includes a right display 602_R adapted for the right eye and a left display 602_L adapted for the left eye.

In FIG. 5, the two-section head mounted system 500 further includes a display scaler IC 610. The display scaler IC 610 is coupled between the image display device 602 (the right display 602_R and the left display 602_L) in the image device 600 and the second conversion device 240. The display scaler IC 610 may improve the resolution of the signal (the fourth parallel electrical signal Spe4) provided from the second conversion device 240 to the image device 600, which is converted into high-resolution-high-frame-rate signals Shrf1 and Shrf2 and respectively output to the right display 602_R and the left display 602_L. Accordingly, the display scaler IC 610 may be used to convert low-resolution-low-frame-rate signals into high-resolution-high-frame-rate signals, thereby solving the problem of insufficient bandwidth for signal transmission.

To sum up, the two-section head mounted system of the disclosure may use optical fiber as the medium for signal transmission, giving full play to the specific advantages of optical fiber, such as stable long-distance transmission, high bandwidth, low loss, low dispersion, light weight, and no EMI interference, while reducing the overall cable diameter. In this way, while making the head mounted part light-weight, the system may also operate stably, meeting the requirements of comfort and stability.

What is claimed is:

1. A two-section head mounted system having an arithmetic processing part, a head mounted part, and a cable part, wherein the arithmetic processing part and the head mounted part are connected to each other through a plurality of optical fiber cables in the cable part, the two-section head mounted system comprising:
    a processor, installed in the arithmetic processing part;
    a first conversion device, coupled to the processor, and configured to perform parallel-to-serial conversion and photoelectric conversion on signals transmitted between the processor and the optical fiber cables;
    an image device, installed in the head mounted part; and
    a second conversion device, coupled to the image device, and configured to perform parallel-to-serial conversion and photoelectric conversion on signals transmitted between the image device and the optical fiber cables.

2. The two-section head mounted system according to claim 1, wherein the optical fiber cables comprise a first optical fiber cable and a second optical fiber cable,
    the first conversion device comprises a first serializer, a first deserializer, a first photoelectric converter, and a second photoelectric converter, the first serializer and the first deserializer are coupled to the processor, and the first photoelectric converter and the second photoelectric converter are respectively coupled to the first serializer and the first deserializer.

3. The two-section head mounted system according to claim 2, wherein in a case where a first parallel electrical signal is sent by the processor, the first conversion device first converts the first parallel electrical signal into a first serial electrical signal through the first serializer, and then converts the first serial electrical signal into a first serial optical signal through the first photoelectric converter, so as to transmit the first serial optical signal through the first optical fiber cable, in a case where a second serial optical signal is received from the second optical fiber cable, the first conversion device first converts the second serial optical signal into a second serial electrical signal through the second photoelectric converter, and then converts the second serial electrical signal into a second parallel electrical signal through the first deserializer, so as to provide the second parallel electrical signal to the processor.

4. The two-section head mounted system according to claim 2, wherein the second conversion device comprises a second serializer, a second deserializer, a third photoelectric converter, and a fourth photoelectric converter, the second serializer and the second deserializer are coupled to the image device, and the third photoelectric converter and the fourth photoelectric converter are respectively coupled to the second serializer and the second deserializer.

5. The two-section head mounted system according to claim 4, wherein in a case where a third parallel electrical signal is sent by the image device, the second conversion device first converts the third parallel electrical signal into a third serial electrical signal through the second serializer, and then converts the third serial electrical signal into a second serial optical signal through the third photoelectric converter, so as to transmit the second serial optical signal through the second optical fiber cable, in a case where a first serial optical signal is received from the first optical fiber cable, the second conversion device first converts the first serial optical signal into a fourth serial electrical signal through the fourth photoelectric converter, and then converts the fourth serial electrical signal into a fourth parallel electrical signal through the second deserializer, so as to provide the fourth parallel electrical signal to the image device.

6. The two-section head mounted system according to claim 4, wherein the first serializer, the first deserializer, the first photoelectric converter, and the second photoelectric converter are installed in the arithmetic processing part, and the second serializer, the second deserializer, the third photoelectric converter, and the fourth photoelectric converter are installed in the head mounted part.

7. The two-section head mounted system according to claim 4, wherein the first serializer and the first deserializer are installed in the arithmetic processing part, the first photoelectric converter and the fourth photoelectric converter are installed on the first optical fiber cable, the second photoelectric converter and the third photoelectric converter are installed on the second optical fiber cable, and the second serializer and the second deserializer are installed in the head mounted part.

8. The two-section head mounted system according to claim 4, wherein the first serializer, the first photoelectric converter, the fourth photoelectric converter, and the second deserializer are installed on the first optical fiber cable, and the first deserializer, the second photoelectric converter, the third photoelectric converter, and the second serializer are installed on the second optical fiber cable.

9. The two-section head mounted system according to claim 1, wherein the image device comprises:

an image display device, configured to display an image according to a received fourth parallel electrical signal; and an image capture device, configured to convert a captured image into a third parallel electrical signal and output the third parallel electrical signal to the second conversion device.

10. The two-section head mounted system according to claim 1, further comprising:

a display scaler IC, coupled between the image device and the second conversion device, and configured to increase a resolution of a signal provided from the second conversion device to the image device.

* * * * *